Figure 1:
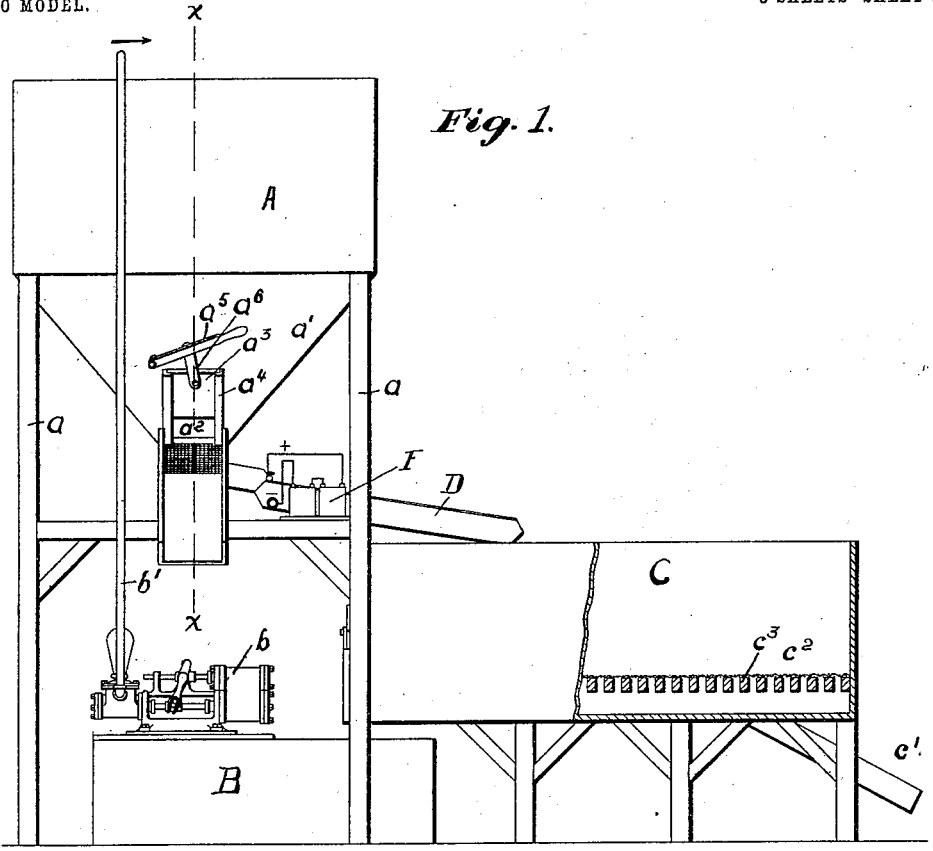

No. 731,169. PATENTED JUNE 16, 1903.
O. A. ELLIS.
APPARATUS FOR EXTRACTING METALS FROM ORES.
APPLICATION FILED JUNE 16, 1902.

NO MODEL. 3 SHEETS—SHEET 1.

Witnesses:
Inventor:
Oscar A. Ellis

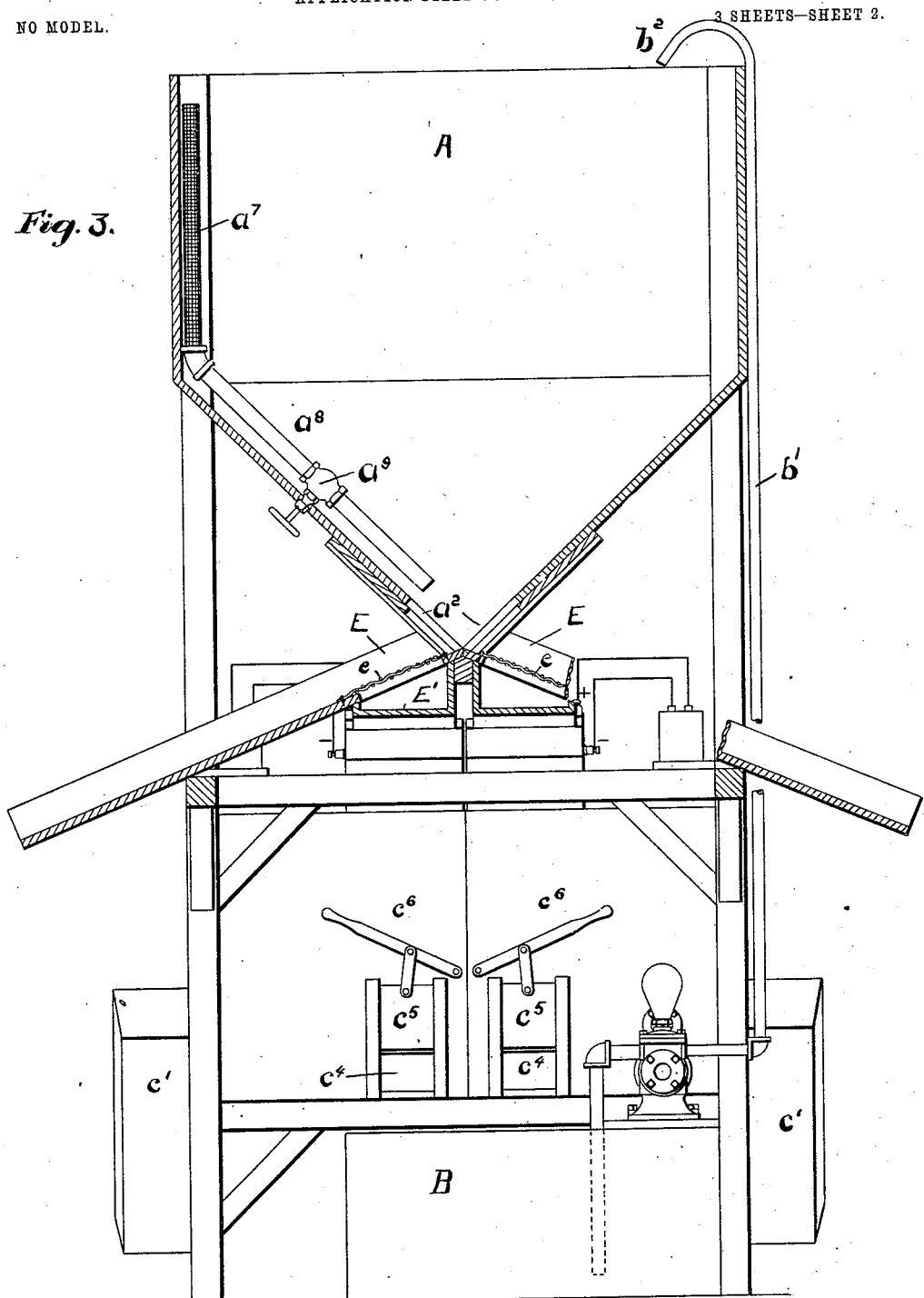

No. 731,169. PATENTED JUNE 16, 1903.
O. A. ELLIS.
APPARATUS FOR EXTRACTING METALS FROM ORES.
APPLICATION FILED JUNE 16, 1902.
NO MODEL. 3 SHEETS—SHEET 3.
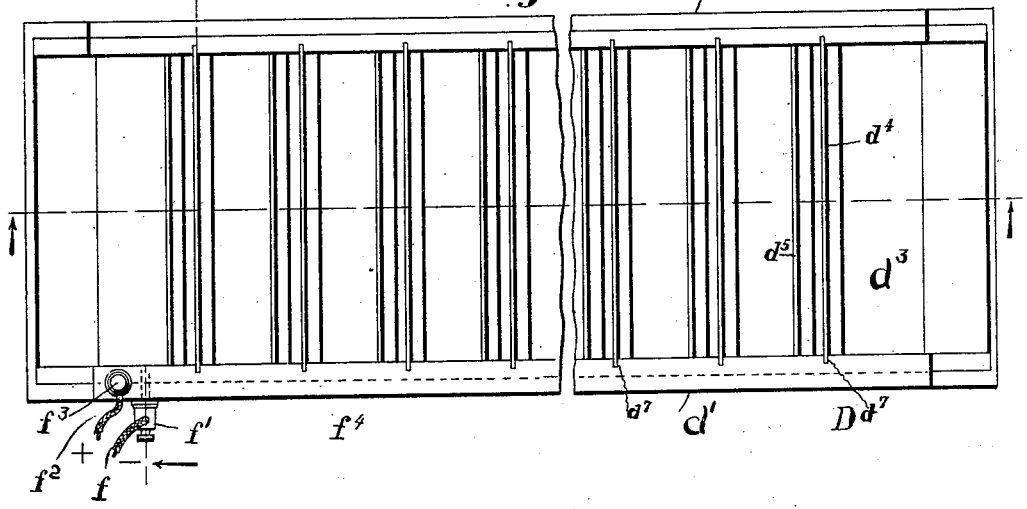
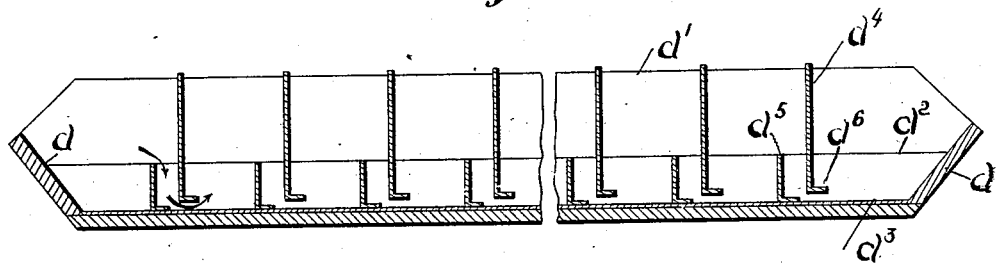
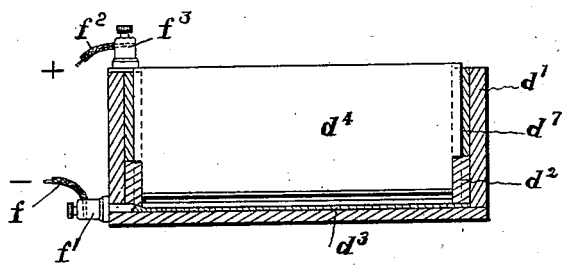
Witnesses:
May A. Kenney
Wm. D. Freudenreich
Inventor:
Oscar A. Ellis
by F. Hart Anderson
Atty.

No. 731,169. Patented June 16, 1903.

UNITED STATES PATENT OFFICE.

OSCAR A. ELLIS, OF ELDORADO CANYON, NEVADA.

APPARATUS FOR EXTRACTING METALS FROM ORES.

SPECIFICATION forming part of Letters Patent No. 731,169, dated June 16, 1903.

Application filed June 16, 1902. Serial No. 111,812. (No model.)

*To all whom it may concern:*

Be it known that I, OSCAR A. ELLIS, a citizen of the United States, residing at Eldorado Canyon, in the county of Lincoln and State of Nevada, have invented certain new and useful Improvements in Apparatus for Extracting Minerals from Ores; and I do hereby declare the following to be a full, clear, and exact description of the invention, such as will enable others skilled in the art to which it appertains to make and use the same.

The present invention relates to an apparatus for the extraction of minerals from ores, and more particularly to an improved apparatus embodying means for the utilization of an electrochemical process of extracting gold and silver from ores.

The object of the present invention is to produce a simple and comparatively inexpensive apparatus for the purpose above set forth so constructed and arranged as to greatly facilitate the manipulation of the ore and obviate the necessity of the employment of power in the transmission of the ore from the receptacle through the precipitating and mineral-extracting devices.

A further object of the invention is to so construct the receiving-hopper and its discharge-apertures with relation to the transferring-chutes connected therewith that the passage of the mixture of chemicals and ores contained in said hopper shall be greatly facilitated and not be dependent upon mechanical stirrers or agitators, as are devices of the prior art.

A further object of the invention is to so arrange the receiving-hopper and its discharging-chutes and precipitating-boxes with relation to the chemical-supplying vats that a constant circulation of the chemical may be secured between the receiving-hopper and the discharging-chutes and precipitating-boxes and whereby said chemical may be used over and over again, thus greatly reducing the cost of carrying out the process, it being understood that the transmission of the ore or pulp (meaning by "pulp" the mixture of chemical liquid and ore) shall occur under the influence of gravity and not be dependent upon mechanically-operated stirrers or agitators.

Further objects of the invention will appear in connection with the following description of its construction, organization, and mode of operation.

To the above ends the present invention consists of the devices and combinations of devices which will be hereinafter described, and particularly pointed out in the claims.

The present invention is illustrated in the accompanying drawings, in which—

Figure 2:
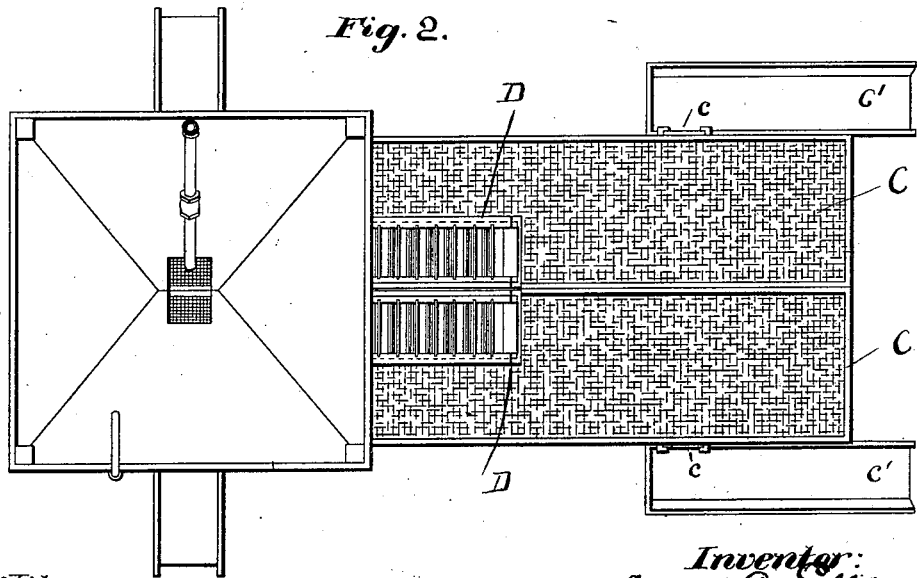

Figure 1 shows in side elevation and partial section the preferred form of the apparatus. Fig. 2 shows a top plan view of the apparatus. Fig. 3 shows a transverse vertical section taken on the line $x\,x$, Fig. 1, showing a receiving-hopper and its immediate adjacent parts in vertical section and the parts below said hopper in elevation. Fig. 4 is a broken top plan view of one of the precipitating-boxes. Fig. 5 is a broken longitudinal sectional view of the precipitating-box shown in Fig. 3. Fig. 6 is a transverse sectional view of said precipitating-box.

Similar letters of reference will be employed throughout the specification and drawings to designate corresponding parts.

In the drawings, A represents the receiving-hopper, into which is discharged or placed by any suitable or convenient means the mass of crushed or pulverized ore and into which is discharged the chemical solution, as will be hereinafter more fully described.

B represents the vat or receptacle in which the chemical solution is prepared and retained and from which it is taken and discharged into the receiving-vat A by any suitable means, such as a pump $b$, which may be of any usual or desired pattern and which forces the chemical solution through the pipe $b'$, which extends upwardly and discharges by the curved end $b^2$ into the receiving-hopper A.

A vat or hopper C is located adjacent to the hopper A and is arranged to receive the mixture of ore and chemical solution from the precipitating-box D after the mineral has been extracted from said ore, and from the vat or hopper C the ore is discharged through suitable gates or openings $c$ down the discharging-chutes $c'$ onto the dump or refuse heap.

At this point it will be perhaps well to call attention to the fact that I have illustrated in the accompanying drawings an apparatus which embodies two precipitating-boxes D and two vats or hoppers C, each having a discharge-chute $c'$, and such is the preferred form of my invention; but it will be understood that I do not limit my invention to such a construction, as it may be present and embodied in an apparatus having only one precipitating-box D, vat or hopper C, and discharge-chute $c'$, or, on the other hand, these elements of the apparatus may be increased in number as desired, the number of these elements being dependent solely upon the amount of material to be subjected to the action of the apparatus and the desire for the expeditious handling of such material. It will be readily observed that by the use of a plurality of precipitating-boxes and the immediate coöperating elements one set of such elements may be thrown out of operation and cleaned and adjusted without disturbing the operation of other series of said elements, so that the continuous operation of the apparatus will not be interfered with.

The receiving hopper or vat A may be constructed of any suitable or convenient material; but it is preferably constructed of wood, which is best adapted to withstand the action of the chemicals. It is substantially rectangular in shape at its upper portion, and is supported upon the uprights or standards $a$ and is provided with an inclined or substantially funnel-shaped bottom $a'$, whereby the passage of the pulp from said hopper is greatly facilitated. The funnel-shaped bottom $a'$ of the hopper A of the apparatus, as illustrated in the drawings, is provided with two openings, $a^2$, which are arranged to be closed or opened by suitable sliding gates $a^3$, which may be constructed and operated in any suitable or convenient manner. As shown in the drawings, the gates $a^3$ are arranged to slide in guides $a^4$ and are operated by levers $a^5$, connected by means of links $a^6$ to said gates $a^3$. It will be understood that a mass of crushed or pulverized ore is deposited in the receiving-hopper A, and the pump $b$ is operated to take from the tank B the chemical solution which is carried up the pipe $b'$ and discharged into the receiving-hopper A onto the mass or crushed or pulverized ore. It is intended that this flow of chemical solution will aid and facilitate the discharge of the pulp from the receiving-hopper A, and for this purpose I have provided a pipe located upon the interior of said hopper and consisting of a short vertical section $a^7$, formed of wire-gauze or perforated metal, and an inclined section $a^8$, having its lower end located adjacent to the discharge-openings $a^2$ at the apex of the bottom of said receiving-hopper A, the section $a^8$ being provided with a cock or valve $a^9$ to regulate the flow of the chemical solution therethrough.

By providing the perforated or reticulated section $a^7$ in connection with the pipe $a^8$ I secure a free flow of the liquid from the mass of pulp, so as to produce a flow at the discharge end of the section $a^8$ sufficient to discharge the pulp from the openings $a^2$, and at the same time I prevent the clogging of said pipe $a^8$ by the entrance thereto of solid matter, a feature of considerable importance in the operation of the apparatus.

It will be noted that by the constant passage of the chemical solution at the bottom of the mass of pulp in the receiving-hopper A adjacent to the discharge-openings $a^2$ I prevent the clogging of the material at the discharging-point.

From the receiving-hopper A the pulp is discharged into the chutes E, which adjacent to the discharge-openings $a^2$ are provided with screens or recticulated bottoms $e$, which permit the passage therethrough of the chemical solution and the solid matter of sufficient fineness to pass through said screens $e$, the larger particles of ore or solid matter being carried down said chutes $e$ by gravity and discharged on the dumps or piles of such material, which may be again passed through the crushers and reduced to such a size as to pass through the screens $e$ when again introduced into the receiving-hopper A. After passing through the screens $e$ the mass of pulp, which, as above explained, consists of the chemical solution and the crushed or pulverized ore, passes to the precipitating-boxes D, down which it flows by gravity and in which as it passes through the said precipitating-box the gold and silver are extracted therefrom. These precipitating-boxes are shown in enlarged views in Figs. 4, 5, and 6, and they consist of elongated troughs having the oppositely-inclined ends $d$ and the side walls $d'$. These precipitating-boxes are preferably formed of wood and have adjacent to the side walls $d'$ wooden strips $d^2$, for a purpose to be hereinafter described. The precipitating-boxes D are provided with a bottom plate $d^3$, of copper, which extends from end to end of the bottom of the boxes, and are also provided with transversely-arranged partitions or plates of copper $d^4$ and $d^5$, said plates being preferably formed with angular flanges $d^6$, whereby to increase the strength as well as their contact surface. The plates $d^4$ extend to the upper edges of the sides $d'$, but do not contact with the bottom of the box, while the plates $d^5$ rest upon the bottom of the box, but do not extend to the top thereof, and, as shown in Fig. 4 of the drawings, the plates $d^5$ alternate with the plates $d^4$ and are closely adjacent to the rear face of said plates $d^4$.

The above arrangement is such that the mass of liquid pulp discharged from the chutes E into the precipitating-boxes D will flow down said boxes over the plates $d^5$ and under the plates $d^4$ and will be discharged at the lower ends of said boxes into the tanks or hoppers C. In the precipitating-boxes the material is subjected to a current of electricity, which may be generated in any suitable or convenient manner, as by means of a dynamo or other generating apparatus or by means of a battery F, the plates $d^4$ and $d^5$ being connected, respectively, to the poles of said electric generator in any suitable or convenient manner. As shown in the drawings, this connection is made by connecting one pole of the battery by means of the conductor $f$, connected to a post $f'$, which, as shown in Fig. 5, connects with the copper plate $d^3$ in the bottom of the generating-box, and inasmuch as the plates $d^5$ rest on said plate $d^3$ said plate is thereby connected with the plates $d^5$, and the opposite pole is connected by means of a conductor $f^2$ to the post $f^3$, which is in turn connected with a copper strip $f^4$, extending along one side $d'$ of the precipitating-box and engaging the upper edges of the plates $d^4$, the arrangement being such that a circuit is formed and a current of electricity passed through the mass of material as it flows through the precipitating-box, which, coacting with the chemical solution, causes the gold or silver to be separated from the ore and deposited upon the metallic transversely-disposed plates $d^4$ of said precipitating-boxes. The plates $d^4$ and $d^5$ may be secured in said boxes in any suitable or convenient manner, but for the purpose of facilitating their easy removal from said boxes the sides thereof are provided with slots $d^7$, into which said plates are fitted. The slimes which are formed are prevented from accumulating in the precipitating-box, and thereby choking the apparatus, on account of the pitch of the box and the weight and momentum of the flowing material. The bottom of the box and the transverse plates being of metal present smooth surfaces which afford little resistance to the passage of the slimy mass. From the precipitating-boxes the chemical solution and solid matter are discharged into the tanks or hoppers C, in which the liquid is separated from the solid, the liquid being returned to the tank or vat B and the solid matter being discharged through the opening $c$ down the chutes $c'$ to the dump, as has been hereinbefore referred to.

For the purpose of separating the chemical solution from the solid matter the tank or hoppers C are provided with a screen or reticulated bottom $c^2$, located at some distance above the bottom of the tank or hopper C and supported upon transverse wooden strips $c^3$, leaving a space beneath the reticulated bottom $c^2$, from which the chemical solution flows through suitable gates $c^4$ into the tank or vat B, to be again pumped up through the pipe $b'$ and discharged into the receiving-hopper A. The gates $c^4$ may be closed in any suitable manner, as by the usual or ordinary cocks or valves, but, as shown in the drawings, they are provided with gates $c^5$, operated by levers $c^6$, substantially as hereinbefore described in connection with the description of the discharge-gates $a^2$ of the receiving-hopper A.

The screen-bottom of the tanks or hoppers $c$ may be made of any material capable of separating the liquid matter from the solid, such as canvas.

While I have illustrated the device as being provided with gates $c^5$ to regulate the passage of the liquid from the tanks or hoppers C, it is obvious that such gates may be dispensed with, as it is not necessary at all times to control the flow of the liquid from said tanks or hoppers C into the vat B.

In the operation of my improved apparatus I have found by actual use that I can use a very much weaker chemical solution than can be used in any similar device which has been heretofore constructed, and I have secured good results from the use of a cyanid solution in the proportion of one to one hundred thousand, or one thousand per cent., whereas in other apparatus with which I am familiar the proportion of minerals to water employed is much greater.

Heretofore in the use of similar processes it has been customary to subject the crushed or pulverized ore for a considerable time to the action of the chemical solution, and for this purpose it was necessary to provide numerous vats and hoppers wherein the material could be allowed to stand for a predetermined length of time, and in such processes it is necessary to employ quite a strong cyanid solution, whereas in my apparatus I subject a small body of ore to a constant flow of chemical solution, which not only thoroughly acts upon the material in the receiving-hopper, but assists in discharging the pulp from said hopper and continues to mix therewith and act thereon during the passage of the material and such small quantities thereof which flow through the precipitating-box. Thus I obviate the necessity of providing large storage-vats for the subjection of the material to the action of the cyanid solution, and inasmuch as the chemical solution is constantly flowing through the apparatus I secure the same action upon a given quantity of material by a much weaker solution than is secured in the methods pursued by the use of the devices of the prior art.

Having described my invention, I claim as new and desire to protect by Letters Patent of the United States—

1. An apparatus for extracting minerals from ores having in combination, a hopper provided with an inclined bottom, an inclined precipitating-box connected with the hopper-outlet, and a filtering-tank arranged below the precipitating-box, whereby a mixture of pulverized ore and chemical solution may be passed from said hopper, through the precipitating-box and into the filtering-tank, by the action of gravity, substantially as described.

2. An apparatus for extracting minerals from ores having in combination, a hopper for receiving ores, and provided with an inclined bottom, an inclined precipitating-box provided with intercalated anode and cathode plates and connected with the hopper-outlet, means for passing a chemical solution into the hopper, whereby the mixture of ore and chemical flows under the action of gravity from the hopper and through the precipitating-box, and means for passing an electric current between the anodes and cathodes, substantially as described.

3. An apparatus for extracting minerals from ores consisting of a hopper provided with an inclined bottom, an inclined precipitating-box connected with the hopper-outlet and a filtering-tank provided with an imperforate and a reticulated bottom, arranged below the precipitating-box, substantially as described.

4. A precipitating-box having in combination, an inclined bottom, a cathode consisting of a metal plate covering said bottom and provided with upwardly-projecting webs, and anodes consisting of L-shaped plates extending between the cathode-webs, substantially as described.

5. An apparatus for extracting minerals from ores, having in combination, a receiving-hopper provided with an inclined bottom, means for discharging the material from said hopper at the bottom thereof, means for discharging a chemical solution into said hopper above the material therein contained and means for discharging a stream of the chemical solution upon the material in said hopper at a point adjacent to the discharge-opening thereof, substantially as described.

6. An apparatus for extracting minerals from ores, having in combination, a receiving-hopper provided with an inclined bottom, a discharge-opening in said bottom, means for discharging a chemical solution into said hopper above the material therein contained, a pipe in said hopper having a perforated upper section arranged to conduct and discharge a stream of the chemical solution upon the material in said hopper at a point adjacent to the discharge-opening in said hopper, substantially as described.

7. An apparatus for extracting minerals from ores, having in combination, a receiving-hopper having an inclined bottom, a discharge-opening in said hopper, an inclined chute leading from said hopper and provided with a screen, a precipitating-box connected with said inclined chute, means for causing a flow of chemical solution through said hopper, chute and precipitating-box and means for passing a current of electricity through said precipitating-box, substantially as described.

8. An apparatus for extracting minerals from ores, having in combination, a receiving-hopper provided with an inclined bottom, a discharge-opening in said bottom, a chute connected with said hopper having a screen at its upper end, a precipitating-box connected with said chute, a tank or vat containing a chemical solution and means for causing a circulation of chemical solution from said vat through the hopper, chute and precipitating-box, substantially as described.

In testimony whereof I affix my signature in presence of two witnesses.

OSCAR A. ELLIS.

Witnesses:
 JAS. G. KENNEY,
 L. LAMPING.